United States Patent [19]

Nyberg et al.

[11] Patent Number: 5,677,472
[45] Date of Patent: Oct. 14, 1997

[54] METHOD FOR EXTRACTING SPHINGOMYELIN

[75] Inventors: Lena Nyberg, Svedala; Hans Burling, Lund, both of Sweden

[73] Assignee: Svenska Mejeriernas Riksfoerening Ekonomi AB, Stockholm, Sweden

[21] Appl. No.: 501,021

[22] PCT Filed: Feb. 10, 1994

[86] PCT No.: PCT/SE94/00105

§ 371 Date: Sep. 21, 1995

§ 102(e) Date: Sep. 21, 1995

[87] PCT Pub. No.: WO94/18289

PCT Pub. Date: Aug. 18, 1994

[30] Foreign Application Priority Data

Nov. 2, 1993 [SE] Sweden ................................ 9300454

[51] Int. Cl.$^6$ ................................................ C07C 1/00
[52] U.S. Cl. .................... 554/20; 554/78; 554/80; 554/82; 554/83
[58] Field of Search .................. 554/82, 83, 20, 554/78, 80

[56] References Cited

FOREIGN PATENT DOCUMENTS 34 45 949   6/1986   Germany .

OTHER PUBLICATIONS

Derwent Abstract of JP–01016708, 1989.
Derwent Abstract of SU–1133275 1985.
Journal of Chromatography, vol. 336, pp. 139–150, 1984, A.G. Andrews, "Estimation of Amniotic Fluid Phospholipids by High–Performance Liquid Chromatography".

Journal of the Society of Dairy Technology, vol. 40, No. 1, pp. 10–12, Feb. 1987, W.W. Christie, et al., "Phospholipids in Milk and Dairy Products".

Database WPI, Derwent Publications, AN 89–064953/09, JP–A–1 016 708, Jan. 20, 1989.

Database WPI, Derwent Publications, AN 85–188560/31, SU–A–1 133 275, Jan. 7, 1985.

*Primary Examiner*—Jose' G. Dees
*Assistant Examiner*—Deborah D. Carr
*Attorney, Agent, or Firm*—Oblon, Spivak, McClelland, Maier & Neustadt, P.C.

[57] ABSTRACT

A method for extracting sphingomyelin from a phospholipid-containing fat concentrate is described. The method comprises the following steps:

A. dissolving the fat concentrate in a solvent mixture of an essentially polar organic solvent and an essentially non-polar organic solvent, B. withdrawing a phase consisting mainly of the non-polar organic solvent and phospholipids dissolved therein, C. adding to the phase withdrawn in step B an organic solvent of intermediate polarity at a temperature of about 13°–25° C., thereby forming a precipitate comprising mainly sphingomyelin, together with a viscous phase and a solvent phase, and then D. withdrawing the precipitate and the viscous phase, and separating them from one another.

11 Claims, 10 Drawing Sheets

SPHINGOMYELIN

PHOSPHATIDYLCHOLINE

PHOSPHATIDYLETHANOLAMINE

SPHINGOSIN

METHOD FOR EXTRACTING SPHINGOMYELIN

BACKGROUND OF THE INVENTION

1. Field of the Invention

The present invention relates to a method for extracting sphingomyelin from a phospholipid-containing fat concentrate.

2. Description of the Background

Sphingomyelin is a lipid of great biological importance. It is to be found in all animal tissues and lipoproteins, especially in plasma membranes and closely related cell parts. The content of sphingomyelins in most animal tissues varies in the range of about 2–15% of the total phospholipid content. Erythrocytes, peripheral nerves and cerebral substance have high sphingomyelin contents of 20–30%.

The only phospholipid which has till now been prepared on a large scale is phosphatidylcholine. The other phospholipids are present in mixtures only. Preparations containing phospholipids are used in different fields, such as in foodstuffs, cosmetics and pharmaceutical products. In the pharmaceutical field, there are two different principles of using phospholipids. The phospholipids may constitute active ingredients in certain medical preparations, but they may also be used to transport medical preparations in the body. At a sufficiently high concentration of phospholipids in water, there are formed closed, liquid-filled spheres, so-called liposomes. Liposomes can be "charged" with constituents and function as small "transport bags".

Sphingomyelins have many different potential applications, among others:

As an effective constituent in skin preparations. Sphingomyelins have a high absorbent capacity and increase the permeability barrier of the skin. It has also been proved that skin irritations are moderated and the healing of wounds is accelerated.

For enrichment of infant formulae. The content of sphingomyelins in commercial infant formulae which are available at present is considerably lower than in human milk.

A derivative of sphingomyelins (sphingosin) has bactericidal properties.

Phospholipids from milk are considered to provide protection against gastric ulcer. They have a surface-active effect and form a hydrophobic layer on the intestinal mucous membrane, which provides protection against gastric acid.

Possible raw material sources for sphingomyelins are, inter alia, milk products, blood products and egg products.

About 0.6% of the total fat content in milk consists of phospholipids. Five different phospholipids are present in butterfat, the approximate percentage distribution being as follows: phosphatidylcholine 34%, phosphatidylethanolamine 32%, sphingomyelin 25%, phosphatidylinositol 5% and phosphatidylserine 3%.

Phosphatidylcholine and phosphatidylethanolamine are the commonest phospholipids both in vegetable tissues and animal tissues. Sphingomyelins, however, are to be found but in animal tissues and are one of the main components in all animal cell membranes.

The various phospholipids resemble each other chemically and physically and therefore are difficult to separate from each other (see FIG. 1).

For the possible applications of sphingomyelin it is most important that sphingomyelin can be extracted in a form which is as pure as possible, and essentially free from other phospholipids.

Prior art methods for extracting phospholipids from fat mixtures comprise separation by precipitation or by chromatography (columns).

A well-known method for separating phospholipids from a lipid-containing concentrate is precipitation from ice-cold acetone. This method is described by, inter alia, Andrews, A. G., J. Chromatogr. 336 (1984) 139, and by Baumy, J. J. et al, Process No. 1047, pp. 29–33. By this method, all phospholipids in the concentrate precipitate in the form of a mixture.

There are many publications describing separation of phospholipids by means of columns, both on a scale of analysis and on a preparative scale. In general, silica gel is used as column packing, but also a bound polar packing can be used, e.g. DIOL or CN packing. The two most frequently used eluting systems are hexane/isopropanol/water and acetonitrile/water. Christie, W. W., J. Soc. Dairy Tech. 40, I (1987) pp. 10–12, describes an HPLC method for analysing phospholipids in milk and dairy products. The method implies that a concentrate of phospholipids is placed on a column of silica gel and eluted with a gradient system.

DE patent specification 3,445,949 A1 (Nattermann & Cie GmbH) discloses a process for isolating phosphatidylcholine from a lipid mixture from plants. A column with silica gel is used, and the lipid mixture is dissolved in the same solvent mixture as is then used as eluent, viz. petroleum ether:isopropanol:water. This is a purely chromatographic process.

SU patent specification 1,133,275 discloses a technique for separating sphingomyelin from animal materials. The method implies that lipids are extracted from animal materials with chloroform:methanol (1:1). Sphingomyelin is purified by causing it to pass through a column with silica gel, eluted with chloroform:methanol (2:8). This, too, is a purely chromotographic separation. The method also comprises washing steps with acid/alkali.

According to European patent specification 0,455,528, use is made of buttermilk for obtaining a mixture of complex lipids containing 66% phospholipids. Complex lipids are separated from neutral lipids by adsorption chromatography. The product is a mixture of phospholipids from milk.

SU patent specification 1,289,440 A discloses a method for extracting phospholipids from animal raw material (buttermilk). The method comprises extraction of acidified buttermilk with an organic solvent and subsequent column chromatography for increasing the yield. As extracting agent, use is made of a mixture of chloroform and methanol. The method comprises chromatography and, respectively, precipitation from acetone, for separating phospholipids from neutral fat. No separation of individual phospholipids is obtained.

JP patent specification 030 47192 A2 discloses a method for purifying phospholipids from milk and dairy products, use being made of centrifugal liquid-partition chromatography (CPC). From an extract of skim milk powder, 99% pure phosphatidylethanolamine was isolated by means of a mixture of hexane:ethanol:water=100:90:10. 97% pure phosphatidylcholine and 98% pure sphingomyelin were isolated by means of a mixture of hexane:diethylether:methanol:water=100:100:80:20 and a mixture of hexane:methanol:water=200:90:10. This is a pure chromatographic method which is not suitable for extracting phospholipids on an industrial scale.

The column separating technique suffers from several drawbacks. The investment costs are high for the process equipment, such as columns, packing, pumps. Large amounts of solvents are required for eluting phospholipids. This, in turn, requires a plant for recovering the solvents.

DE patent specification 3,800,468 A discloses a method for removing phospholipids from whey by raising the pH, heating and adding calcium. This results in whey of better quality. The idea of the method thus is to reduce the fat content of whey, and no separation of the removed phospholipids is described.

JP patent specification 030 58944 A discloses a method for separating the phospholipids phosphatidylethanolamine and phosphatidylcholine. As raw material, use is made of yolk, soyabean or maize. The lipid fraction is dissolved in a non-polar or slightly polar solvent (chloroform, hexane, acetone, ethanol, ethylacetate etc.). The solvent is cooled to between $-30°$ C. and $-20°$ C. By warming the solution to $0°-10°$ C., a precipitate is obtained, containing phosphatidylethanolamine and a supernatant containing phosphatidylcholine. By this method, no sphingomyelin is obtained.

SUMMARY OF THE INVENTION

The object of the present invention is to provide an industrially applicable method for economical extraction of sphingomyelin from fat concentrates deriving from different animal products, such as milk products, blood products and egg products. The following demands can be placed on such a method:
1. It should give a high yield of sphingomyelin in combination with high purity of the product.
2. It should be an economical method.
3. The method should be hygienic.

The object of the present invention is achieved by a method for extracting sphingomyelin from a phospholipid-containing fat concentrate, said method being characterised by the steps of
A. dissolving the fat concentrate in a solvent mixture of an essentially polar organic solvent and an essentially non-polar organic solvent,
B. withdrawing a phase consisting mainly of the non-polar organic solvent and phospholipids dissolved therein,
C. adding to the phase withdrawn in step B an organic solvent of intermediate polarity at a temperature of about $13°-25°$ C., thereby forming a precipitate comprising mainly sphingomyelin, together with a viscous phase and a solvent phase, and then
D. withdrawing said precipitate of mainly sphingomyelin and the viscous phase, and separating them from one another.

A great advantage of the invention is the limited consumption of solvent as compared to column separating methods. Moreover, the method requires comparatively simple and, thus, inexpensive equipment.

DETAILED DESCRIPTION OF THE INVENTION AND PREFERRED EMBODIMENTS THEREOF

According to the invention, a method is provided for extracting an enriched fraction of sphingomyelin on an industrial scale by means of a precipitation process. Pure fractions of sphingomyelin have up to now not been prepared on an industrial scale. Prior art methods for extracting sphingomyelin have utilised column chromatography and have merely involved small quantities.

As starting product for the method according to the invention, use is made of a fat concentrate which derives from different types of animal products, such as milk products, blood products and egg products.

A convenient milk raw material is buttermilk which is the aqueous phase obtained as a by-product in butter-making. Buttermilk powder is obtained after evaporating and drying this aqueous phase. Also non-evaporated butter-milk can be used as raw material for the fat concentrate. The buttermilk fat content is then concentrated by a microfiltering process.

Another milk raw material is whey. The fat content of separated whey is about 0.05%. One third of this fat is phospholipids. This fat fraction can be separated from whey by various prior art methods and may subsequently be used as raw material for the invention.

The phospholipid composition in blood is very similar to the one in milk. A fat fraction from blood therefore is also useful as raw material for the invention.

Also the fat fraction from hens' eggs can be used as raw material for the invention.

For better understanding of which solvents can be used in the method according to the invention, here follows the chemical background.

A sphingomyelin molecule (see FIG. 1) is composed of a phosphorylcholine group, a fatty acid and a sphingoid base (SPhB). The fatty acid is bound to the primary amino group on carbon atom No. 2 in SPhB via an amide linkage. Naturally occurring sphingomyelins vary as to SPhB and acyl group. The commonest SPhB is an aminediol with 18 carbon atoms (1,3-dihydroxy-2-amino-4-octadecene). This compound, which is called sphingosine (see FIG. 1) has a trans-double bond between carbon atoms 4 and 5. The commonest acyl groups in sphingomyelins are, to a decreasing extent: C16, C24:1, C22 and C24. The fatty acids are tissue-specific. For example, white tissue from human brain comprises C24:1, whereas brown tissue comprises C18.

The molecular structure of both sphingomyelins and glycerophospholipids is characterised by geographic segregation between polar and non-polar parts. The molecules consist of a polar "head" and one or two hydrophobic "tails" interconnected by a region of intermediate polarity. Owing to this segregation inside the molecule, there is no solvent suitable for both the head and the tail. As a result, molecules of this type, designated amphiphiles, will form complex structures in order to minimise undesired contacts with solvents. The structure of the aggregates depends both on the amphiphile and the solvent. In water, which is the biological environment of these molecules, sphingomyelins and phosphatidylcholines spontaneously form bilayers. In these lamellar structures which have a thickness of two molecules, the hydrophobic tails form a hydrophobic nucleus, while the polar heads form a surface layer.

Phosphorylcholine is the polar main group in both sphingomyelins and phosphatidylcholines, but the other parts of the molecules have different distinctive features (see FIG. 1). The hydrophobic parts distinguish from each other, e.g. regarding the length of the hydrocarbon chains and the amount of double bonds.

The difference between sphingomyelin and phosphatidylcholine is even greater in the intermediate region. In the sphingomyelins, the amide linkage between the acyl chain and the primary amino group on carbon 2 and the hydroxyl group bound to carbon 3 yields a high capacity as hydrogen bonding donor. This capacity is not to be found in phosphatidylcholine. Instead, the carboxyl oxygen can function as hydrogen bonding acceptor in phosphatidylcholine. The differences in the hydrogen bonding capacity are reflected in the interactions of these lipids with other lipids and with membrane proteins. The differences in structure also result in differences in physical properties for sphingomyelins and phosphatidylcholines in by-structures. In many systems, the total amount of the two choline lipids is about half of the total amount of phospholipids, but the ratio may vary to a high degree. Variations in this ratio are important to the properties of the mixture.

One of the most obvious differences between phosphatidylcholines and sphingomyelins is the temperature for the transition from gel phase to liquid crystalline phase. Most sphingomyelins have a transition temperature in the physiological temperature range (about 37° C.), whereas almost all naturally occurring phosphatidylcholines have a considerably lower transition temperature, and thus a temperature of 37° C. is clearly above their transition temperature. Mixed phosphatidylcholine/sphingomyelin bilayers containing more than 50% of sphingomyelins have a transition close to 37° C., whereas bilayers having a lower content of sphingomyelins have no transition at such a high temperature. This is also reflected in the microviscosity of the mixed bilayer at 37° C., which increases as the content of sphingomyelins increases.

The inventive method for extracting sphingomyelin is based on the fact that the solubility of sphingomyelins in a mixture of an organic solvent of intermediate polarity and an essentially non-polar organic solvent is lower than for the other phospholipids in the mixture.

The principle for isolating sphingomyelin thus is to add to a mixture of neutral fat and phospholipids dissolved in an essentially non-polar organic solvent, an organic solvent of intermediate polarity in a suitable amount, whereby sphingomyelins precipitate, while the other phospholipids and neutral fat remain dissolved.

In a preferred embodiment of the invention, the rest of the phospholipids can, after the separation of the sphingomyelin precipitate, be precipitated by lowering the temperature.

The amount of the organic solvent of intermediate polarity which is required to precipitate the sphingomyelins depends on the concentration of the sphingomyelins and the other phospholipids in the phase of essentially non-polar, organic solvent, and on the temperature.

A concentrate is dissolved in a two-phase system consisting of an essentially non-polar organic solvent and an essentially polar organic solvent. As explained above, sphingomyelins cannot be dissolved optimally in merely a non-polar organic solvent owing to the amphiphilic character. The solubility is therefore improved by adding a polar solvent. The two-phase system involves washing of the fat concentrate, since lactose, salt and protein pass to the polar phase.

After separation, neutral fat and phospholipids are to be found in the phase of non-polar organic solvent.

The phase of essentially non-polar organic solvent is mixed with an organic solvent of intermediate polarity in a suitable amount and at a suitable temperature, whereby the sphingomyelins precipitate selectively, whereas the other phospholipids are concentrated to a viscous, "brown phase" which, after examination under microscope with plain-polarised light, seems to be a liquid crystalline phase. Neutral fat and some of the other phospholipids remain dissolved. The sphingomyelin precipitate and the "brown phase" are withdrawn. In order to precipitate, if desired, the rest of the other phospholipids, i.e. phosphatidylethanolamine and phosphatidylcholine, the temperature of the remaining solution is lowered.

To dissolve the amphiphilic phospholipids, use is made, as mentioned above, of a mixture of an essentially non-polar organic solvent and an essentially polar organic solvent. The essentially non-polar organic solvent can be exemplified by n-heptane, n-hexane, cyclohexane, iso-octane, toluene, chloroform. The essentially polar organic solvent can be exemplified by an alcohol, such as ethanol, methanol, propanol, butanol. In the polar solvent, the head of the molecule is soluble, and in the non-polar solvent, the tails are soluble. Organic solvents of intermediate polarity dissolve neither the polar head nor the hydrophobic tails. This probably explains why sphingomyelin and the other phospholipids can be precipitated by means of an organic solvent of intermediate polarity. Examples of such a solvent is acetone, 2-butanone, 2-pentanone, 3-pentanone, methyl acetate, ethyl acetate; acetone being especially preferred.

The various phospholipids precipitate at different temperatures owing to the above-mentioned difference in transition temperature for transition from gel phase to liquid crystalline phase. By keeping the solvent mixture at a temperature of about 13°–25° C., mainly sphingomyelin is precipitated. After separating the solution, the remaining phospholipids can be precipitated by lowering the temperature of the solvent mixture to about 0°–5° C.

The sphingomyelin precipitate can, after separation, be washed with an additional amount of the same solvent mixture as is used in the precipitation at a temperature which is slightly above the precipitation temperature, for example about 25° C., and during agitation. After adjusting the temperature of the mixture at a temperature in the precipitation range, i.e. about 13°–25° C., the precipitate is centrifuged off and dried. As a result, the remaining phospholipids are dissolved from the sphingomyelin precipitate and the purity of the precipitate rises to 70%.

The precipitation of sphingomyelins is thus carried out at about 13°–25° C., i.e. at about room temperature or just below. Preferably, the precipitation is carried out at about 15°–21° C., especially at about 20° C.

The sphingomyelin product can be further purified by using a simplified chromatography technique. The precipitate is dissolved in a suitable solvent mixture (see above) during heating and is then pumped through a column with a suitable packing. This yields as high a degree of purity as 95% sphingomyelin.

The ratio of the organic solvent of intermediate polarity to the essentially non-polar organic solvent should preferably be in the range of 1:1–2:1.

A further factor which may affect the efficiency in the precipitation of sphingomyelins is the concentration of the sphingomyelins in the phase of essentially non-polar organic solvent. This concentration should suitably be in the range of 2–20 mg/ml for maximum efficiency.

One important raw material for phospholipids is buttermilk. Buttermilk is obtained in large quantities as a by-product in buttermaking. Buttermilk can be dried to a yellowish-white powder, buttermilk powder. Buttermilk powder is composed approximately as follows:

|  | % by weight |
| --- | --- |
| Lactose | 49 |
| Protein | 34 |
| Ashes | 7 |
| Fat | 5 |
| Dry matter | 96 |

The fat portion, which is about 5% of the powder, is composed of neutral lipids (about 75% of the fat portion) and complex lipids from the fat globule membranes (about 25% of the fat portion). The complex lipids comprise above all phospholipids.

The fat in buttermilk powder can be recovered e.g. by extraction of the powder with ethanol. The method of recovering fat from buttermilk powder (or, in other words, defatting the powder) by extraction is disclosed in SE patent specification 7801821-5.

In the ethanol extraction, a crude extract comprising phospholipids is obtained, composed as follows:

|  | % by weight |
|---|---|
| Dry matter | 70 |
| Protein | 3 |
| Lactose | 10 |
| Salt | 6 |
| Ashes | 9 |
| Fat | 35 |
| The fat portion comprises phospholipids: | |
| Phosphatidylcholine | 3 |
| Phosphatidylethanolamine | 3 |
| Sphingomyelin | 2 |

This crude extract may be used as starting product for the method according to the invention.

The enclosed Figures illustrate the following:

FIG. 1 presents molecular formulae for various phospholipids and the commonest sphingomyelin base (sphingosin).

The invention will now be described in more detail by means of the following Examples.

EXAMPLE 1

Figure 1A:
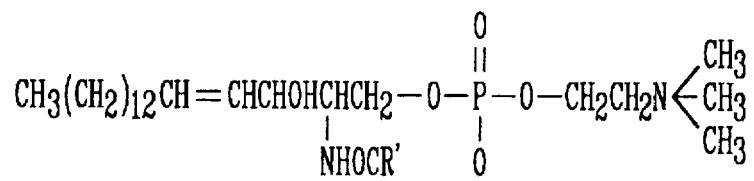
Figure 1B:
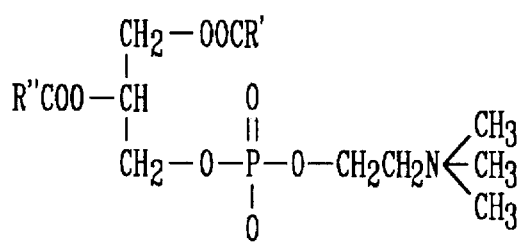
Figure 1C:
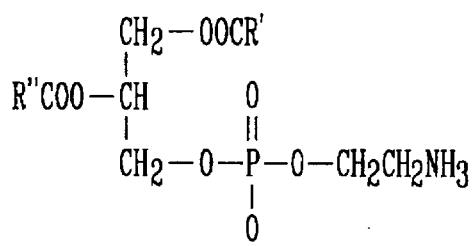
Figure 1D:
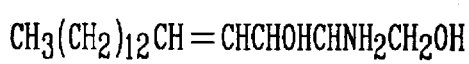
Figure 2:
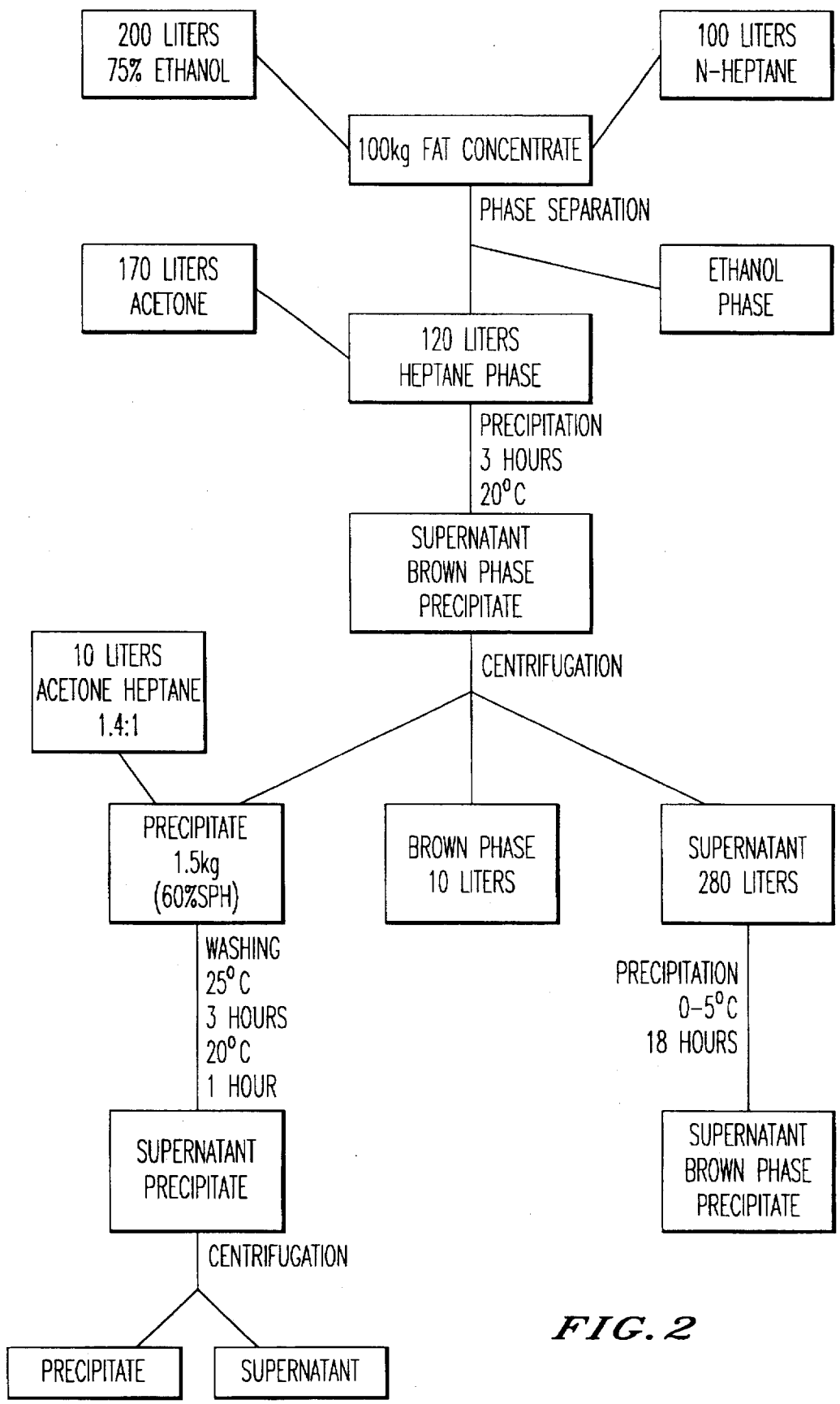
FIG. 2 is a flow diagram for an embodiment of the invention according to Example 1.
Figure 3:
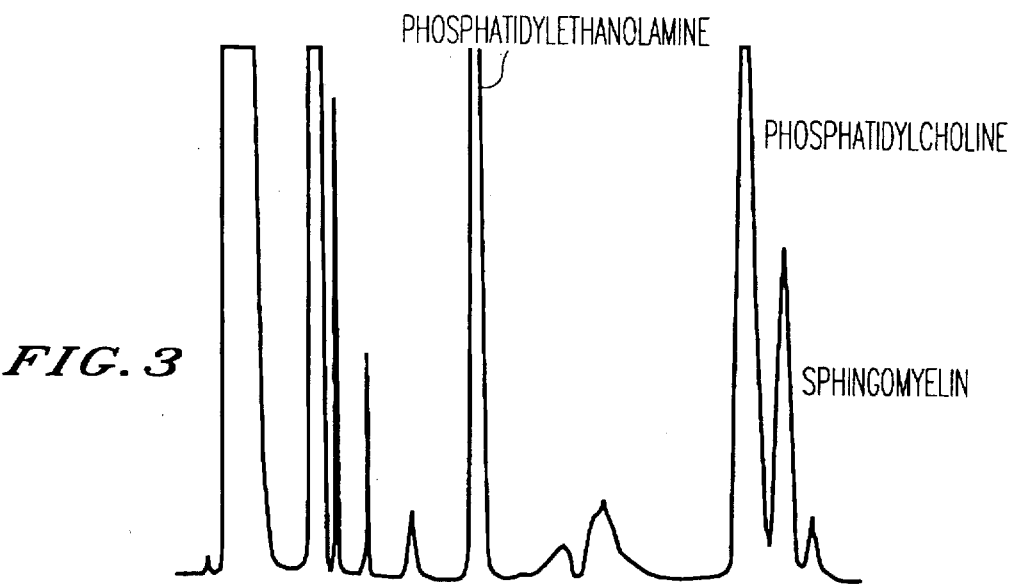
FIGS. 3–7 are chromatograms showing the increase of the degree of purity of the sphingomyelin in the various steps of the method according to the invention.

21 kg of fat extract from buttermilk powder were mixed with 42 l of 75% ethanol and 21 l of n-heptane. After phase separation, 24.5 l of heptane phase were obtained, comprising neutral fat and phospholipids. Chromatography (FIG. 3) of the heptane phase presented the following phospholipid composition:

| Phosphatidylethanolamine PE: | 14 mg/ml | In all 343 g |
|---|---|---|
| Phosphatidylcholine PC: | 14 mg/ml | 343 g |
| Sphingomyelin SM: | 10 mg/ml | 245 g |

The heptane phase was mixed with 38 l of acetone (ratio of acetone to heptane 1.5:1). The mixture was allowed to stand for 3 h at 20° C., thereby forming a white precipitate comprising sphingomyelin.

The mixture was centrifuged, whereby a bottom layer containing a precipitate was obtained. Above the precipitate, there was a viscous "brown phase" and, above this, a clear solution.

Figure 4:
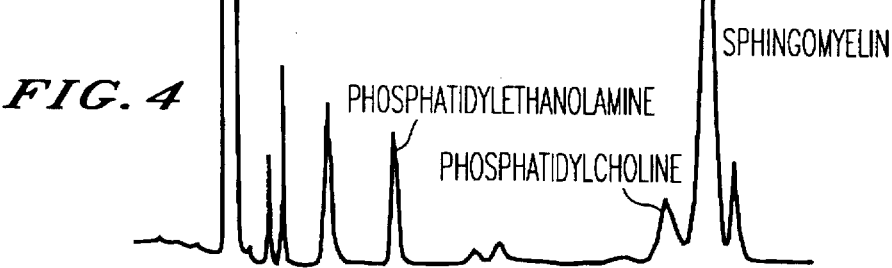

The precipitate was separated off and dried, thereby obtaining 309 g of precipitate. Composition: 60% sphingomyelin, 3% phosphatidylethanolamine, 3% phosphatidylcholine (chromatogram, see FIG. 4).

Figure 5:
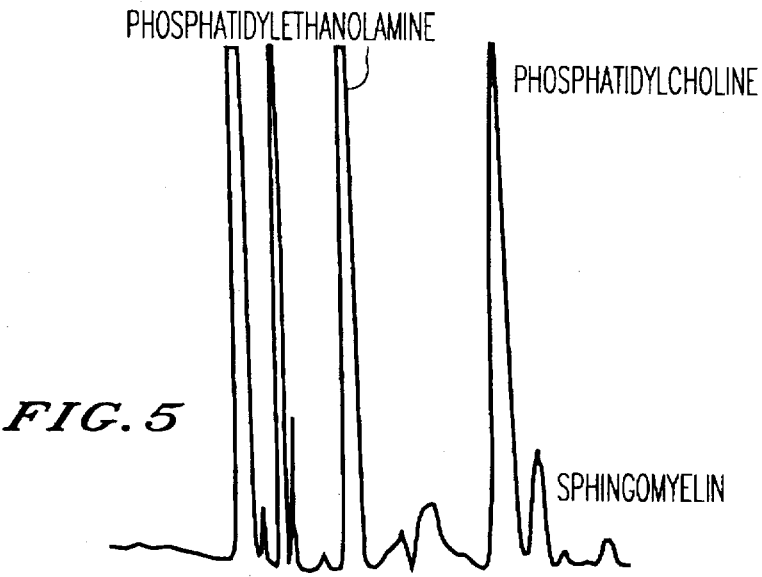

2.2 l of so-called "brown phase 1" were separated, containing a concentrate of phospholipids (chromatogram, FIG. 5) of the following composition:

| PE: | 98 mg/ml | In all 216 g |
|---|---|---|
| PC: | 98 mg/ml | 216 g |
| SM: | 24 mg/ml | 53 g |

Examination of the phase under microscope with plain-polarised light reveals clear double refraction, which indicates that it is a liquid crystalline phase, probably a reversed hexagonal phase.

The supernatant, 56 l, contained low contents of phospholipids:

| PE: | 1.7 mg/ml | In all 95 g |
|---|---|---|
| PC: | 1.7 mg/ml | 95 g |
| SM: | 0.2 mg | 11 g |

By lowering the temperature of the supernatant to 5° C., more phospholipids could be separated in the form of a precipitate and a brown phase:

| Precipitate from heptane/acetone phase, after 18 h at 5° C. (66 g): | | |
|---|---|---|
| PE: | 218 mg/g | In all 14 g |
| PC: | 218 mg/g | 14 g |
| SM: | 119 mg/g | 8 g |
| "Brown phase 2" after 18 h at 5° C. (390 ml): | | |
| PE: | 96 mg/ml | In all 36 g |
| PC: | 96 mg/ml | 36 g |
| SM: | 10 mg/ml | 4 g |
| Heptane/acetone phase, after 18 h at 5° C. (about 55 l): | | |
| PE: | 0.7 mg/ml | In all 38 g |
| PC: | 0.7 mg/ml | 38 g |
| SM: | — | — |

Figure 6:
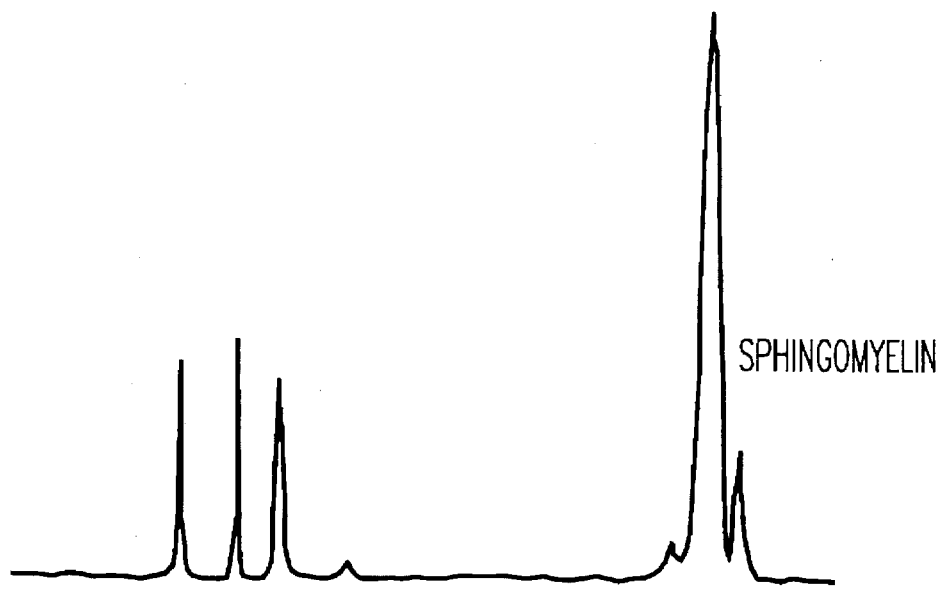

The sphingomyelin precipitate was washed with 2 l of acetone:heptane (volume ratio 1.4:1) at 25° C. during agitation for 3 h. The temperature of the mixture was then adjusted for 1 h at 20° C., whereupon the precipitate was centrifuged off and dried. In this washing procedure, the remaining phospholipids were dissolved from the sphingomyelin precipitate. The composition of the precipitate after washing (chromatogram, FIG. 6): 70% sphingomyelin, other phospholipids less than 1%, other lipids 25% (cholesterol, ceramidehexosides, cardiolipin).

To obtain an even purer sphingomyelin product, use was made of chromatography. Column: Buchi 100×460 mm (3750 ml). Packing: Bondesil Si 40 µm.

The lipids were eluted with two different solvent mixtures.

150 g of precipitate were dissolved in 1.5 l of heptane:isopropanol (volume ratio 2:1) during heating to 40° C. The solution was pumped on the column and the elution was started.

| | Elution: | | |
|---|---|---|---|
| | Solvent heptane:isopropanol:water | | Volume |
| Solvent 1 | 61 | 36 | 3 | 161 |
| Solvent 2 | 31 | 58 | 11 | 181 |

Figure 7:
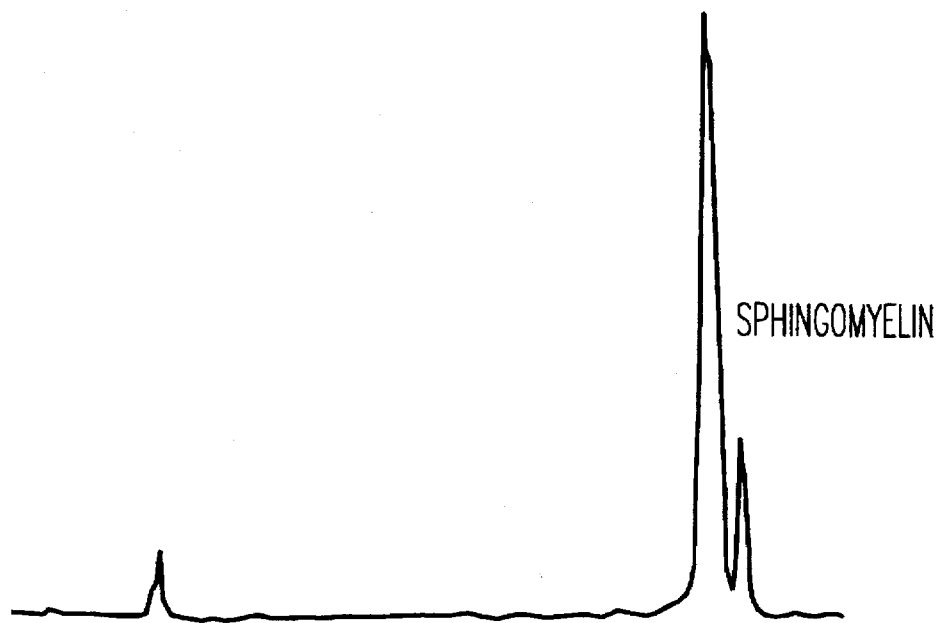
Figure 8A:
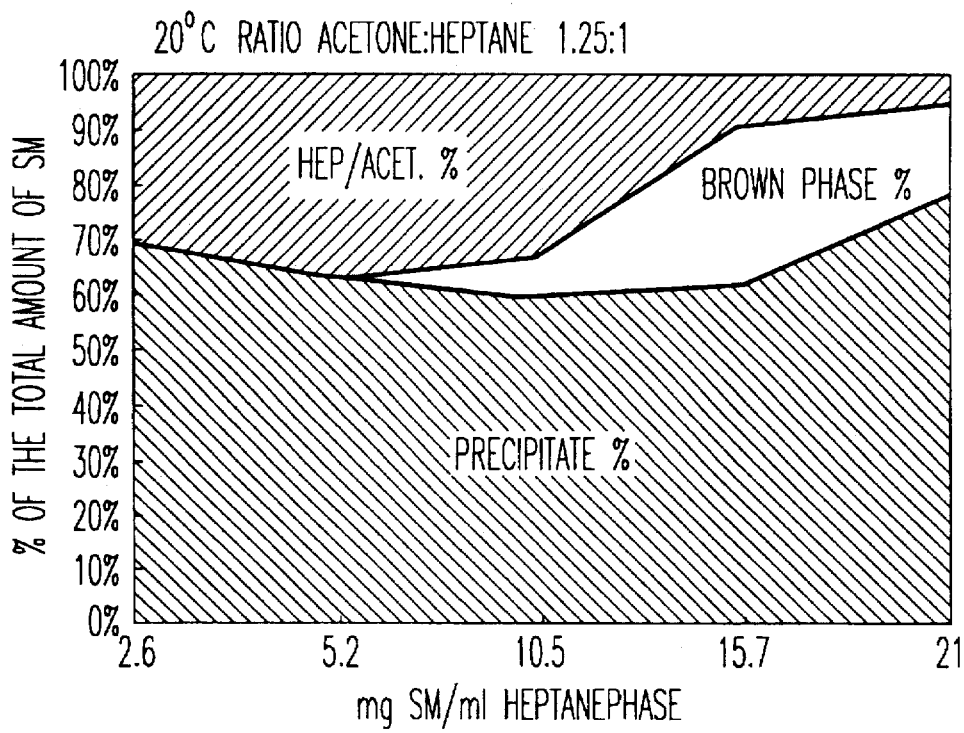
FIGS. 8–10 show the results of the precipitation of three phospholipids according to Example 2.
Figure 8B:
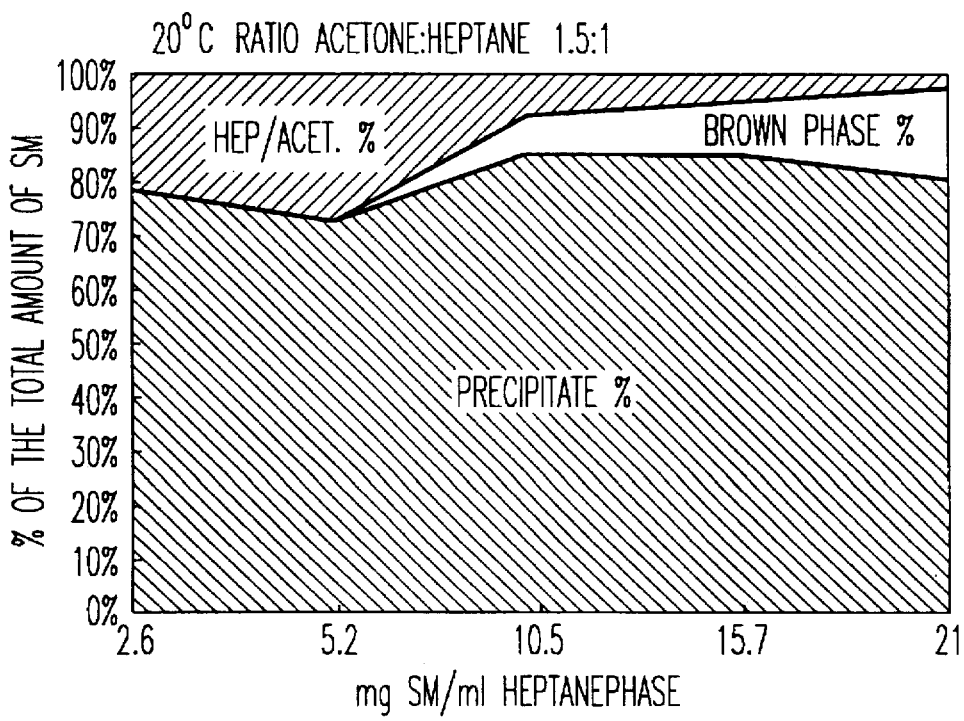
Figure 8C:
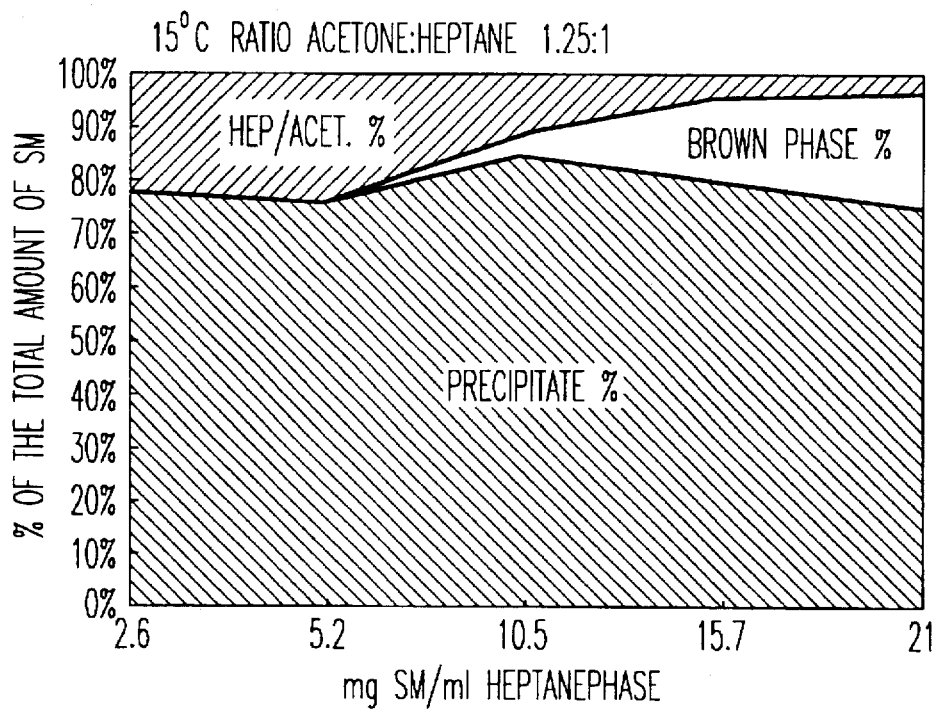
Figure 8D:
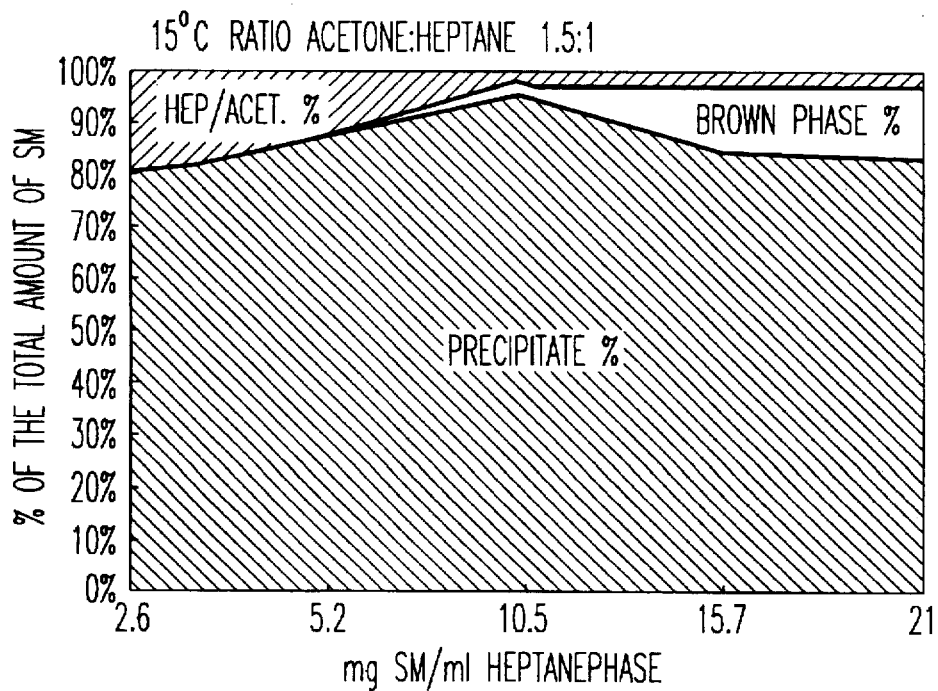
Figure 9A:
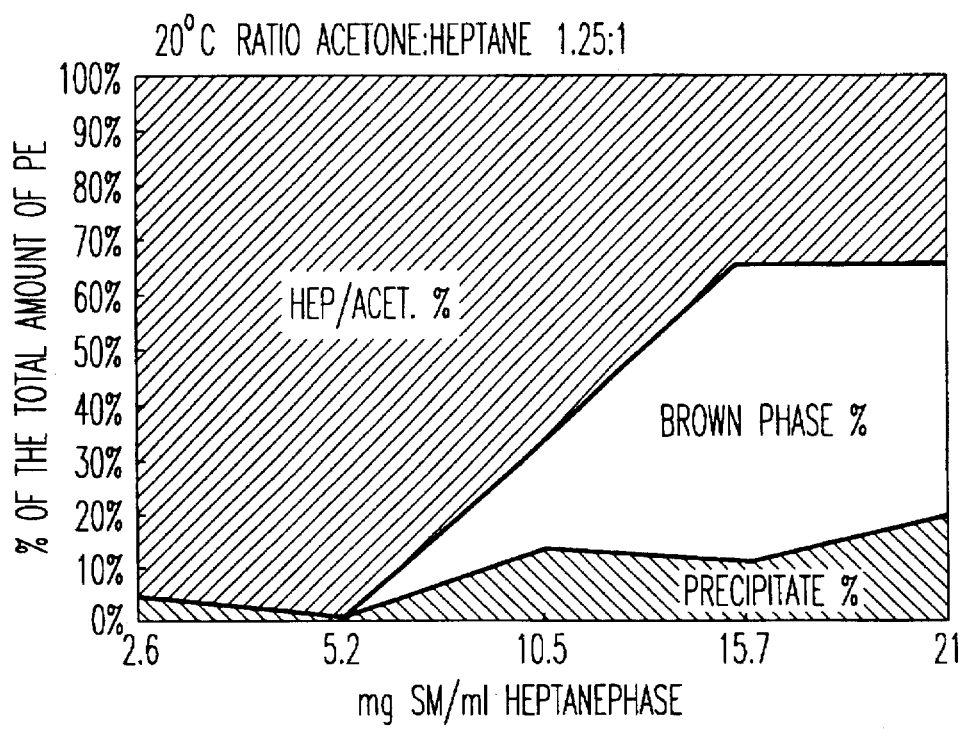
Figure 9B:
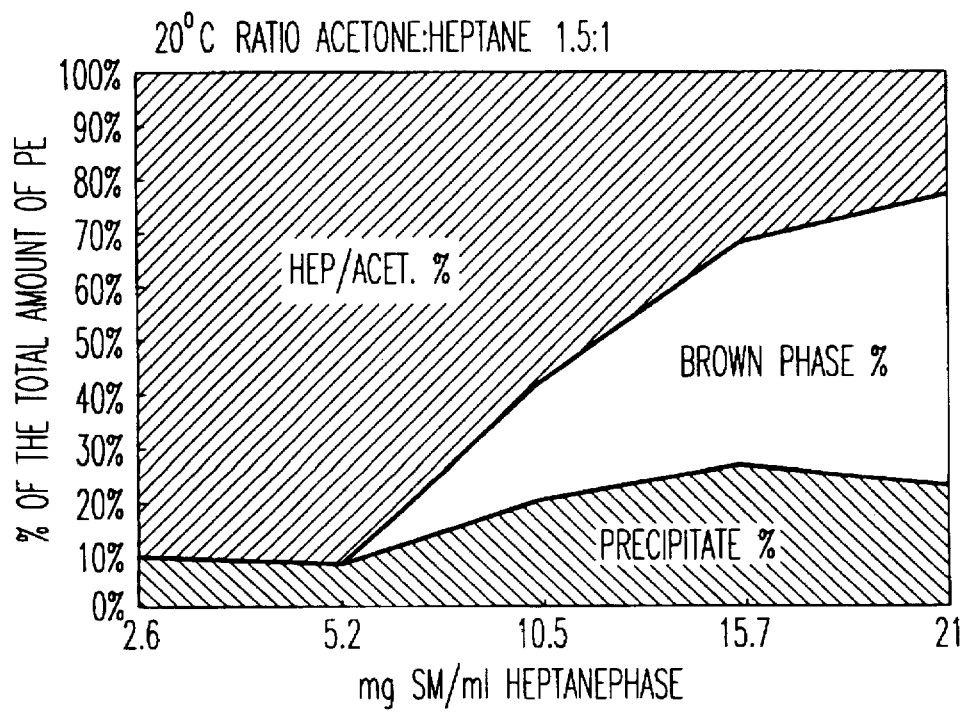
Figure 9C:
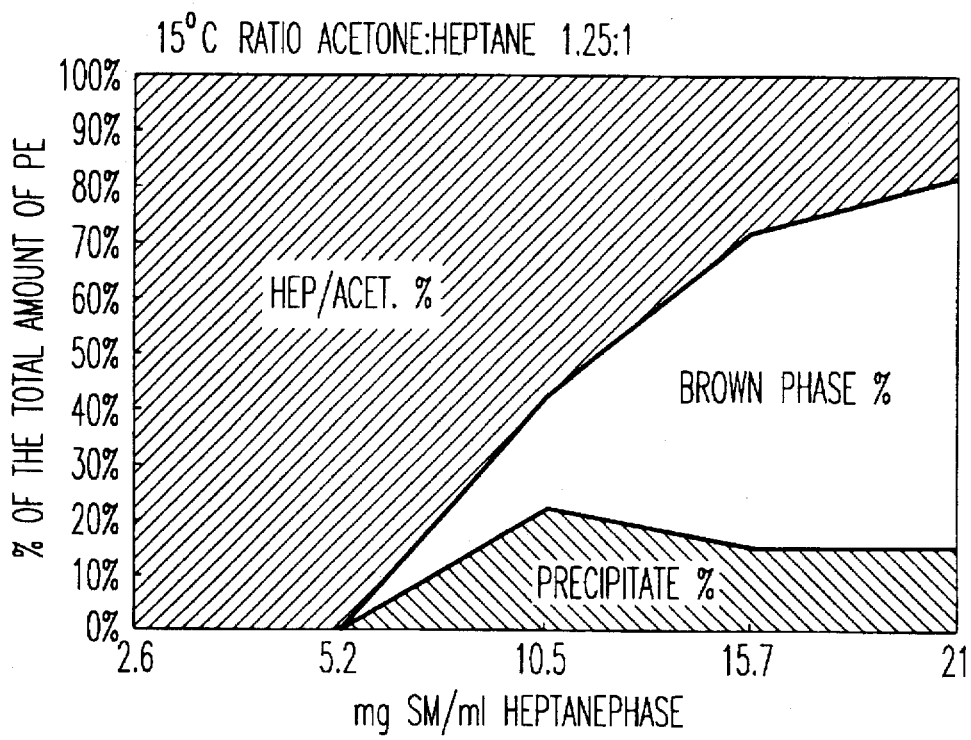
Figure 9D:
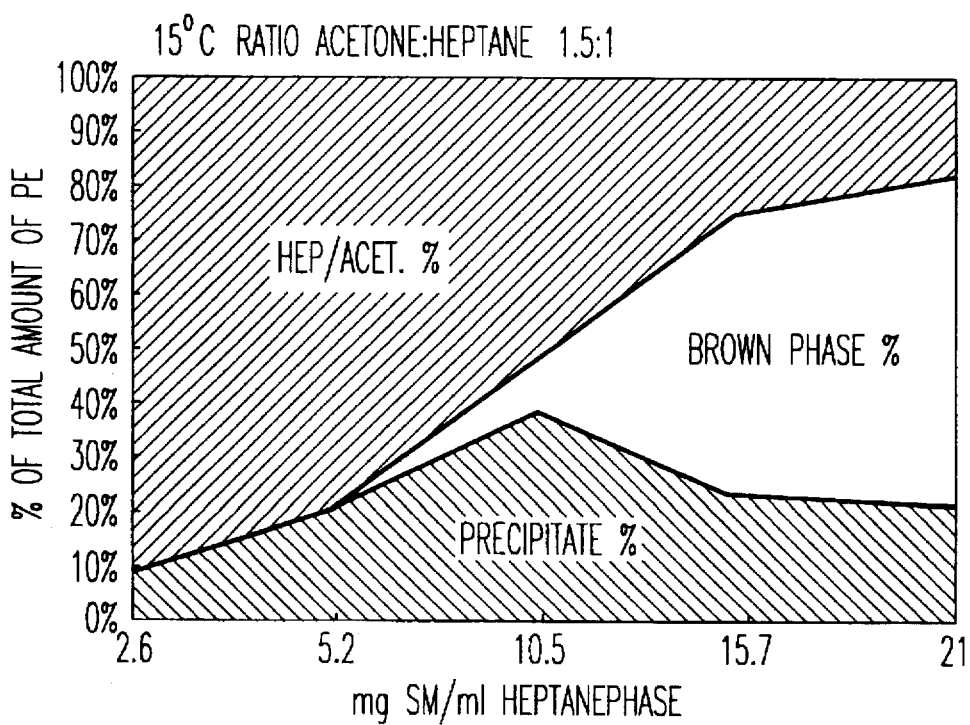
Figure 10A:
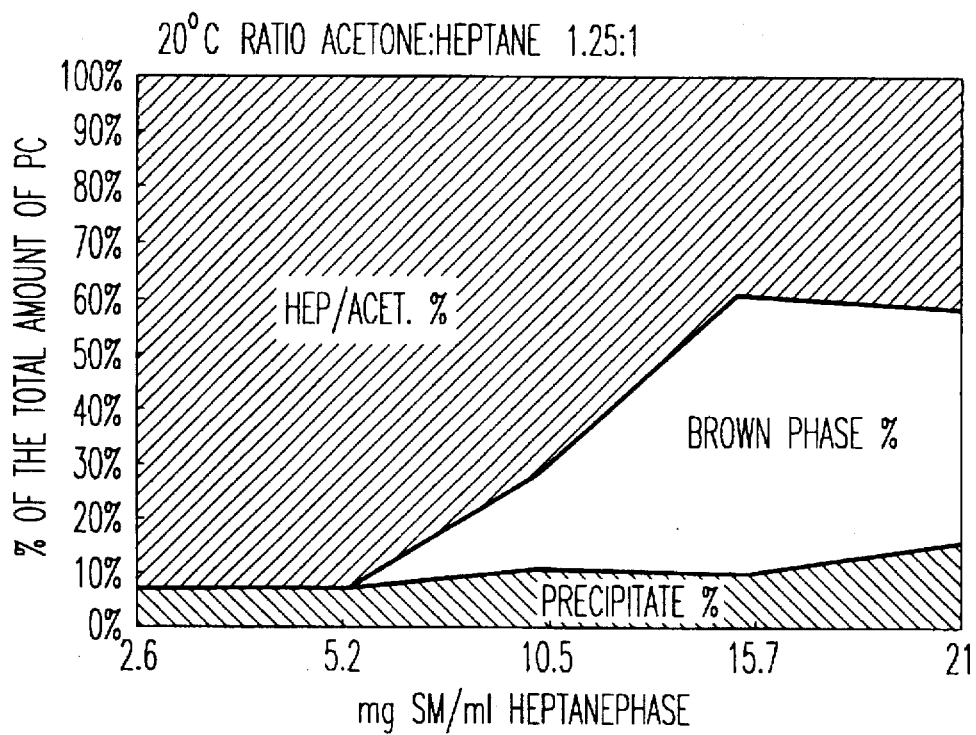
Figure 10B:
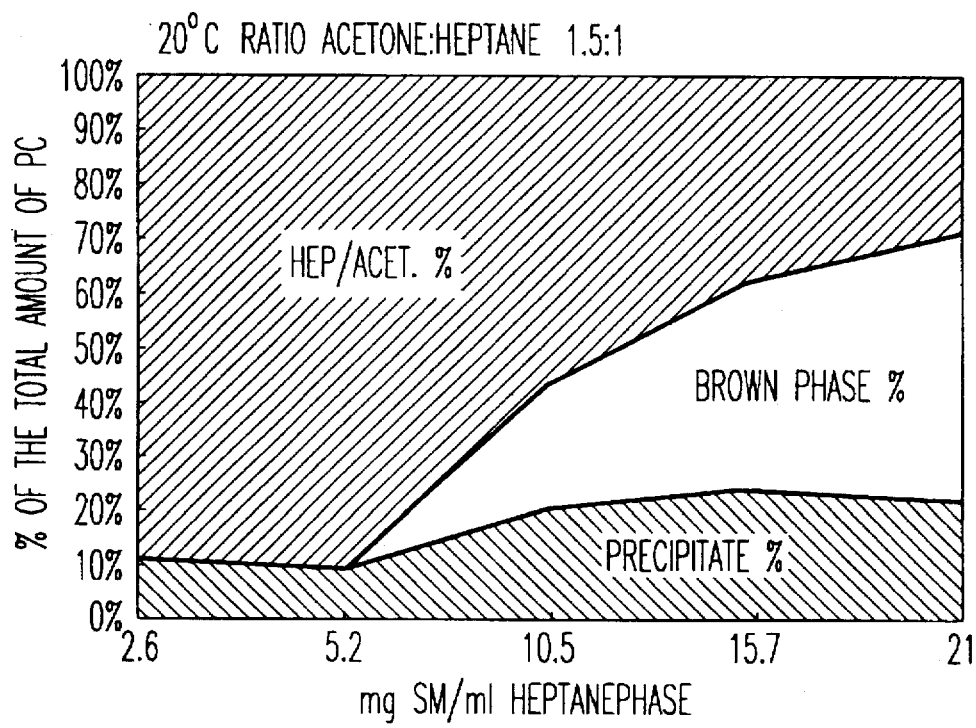
Figure 10C:
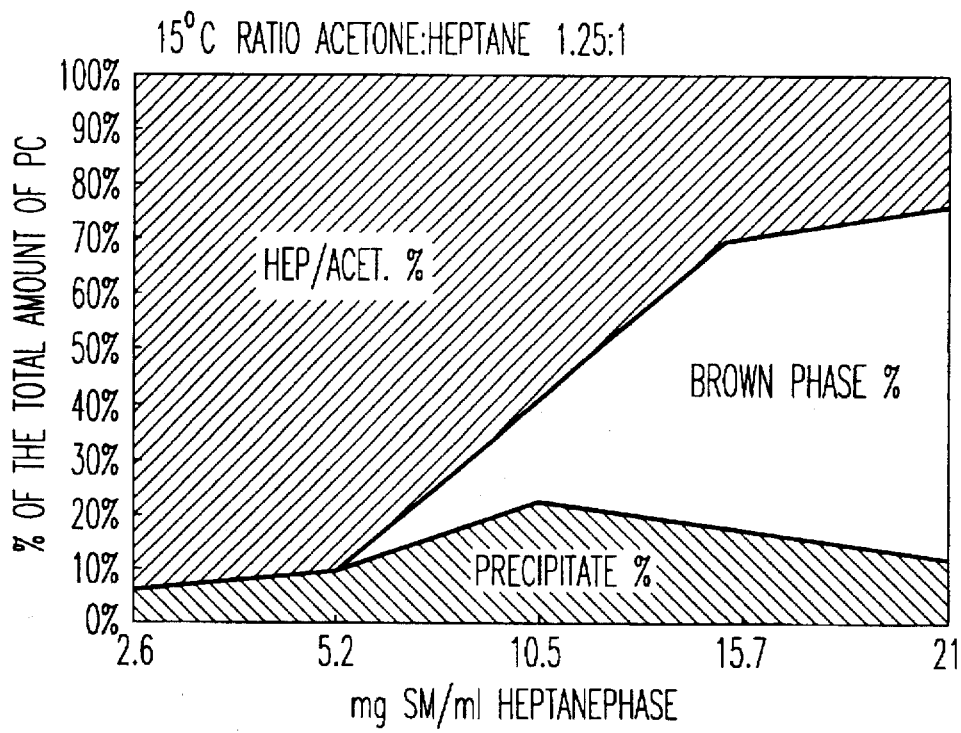
Figure 10D:
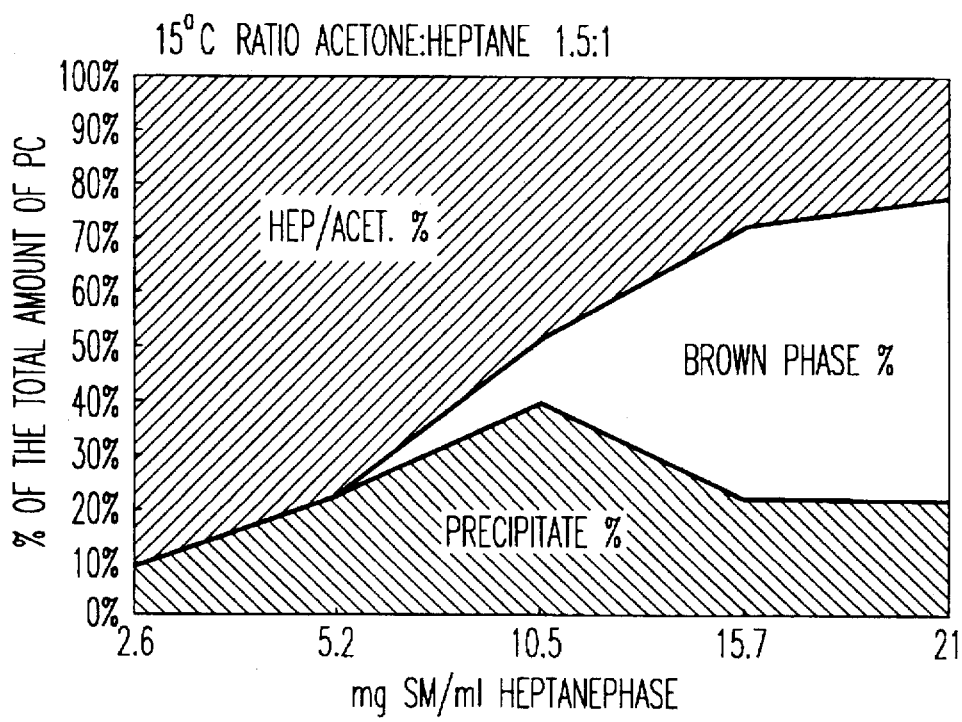

Sphingomyelin was eluted with solvent 2. The fraction was evaporated and dried. 110 g of product were obtained, with a sphingomyelin content of 95% (chromatogram, FIG. 7).

EXAMPLE 2

Investigation of how variations of the experimental conditions affect the precipitation of sphingomyelin from a heptane extract.
Variables:
Volume ratio acetone/heptane: 1.5:1 and 1.25:1
Temperature: 15° C. and 20° C.

As starting solution, use was made of a heptane extract containing 29 mg/ml phosphatidylethanolamine (PE), 32 mg/ml phosphatidylcholine (PC), 21 mg/ml sphingomyelin (SM). From this extract, 20, 15, 10, 5 and 2.5 ml, respectively, were taken. All samples were diluted to 20 ml with n-heptane. 25 and 30 ml, respectively, of acetone were added to the samples which were stored for 18 h at 20 and 15° C., respectively. The precipitate was separated by centrifugation and the amount of "brown phase" was measured. The "brown phase" was greater, the more concentrated the used heptane phase. The distribution of phospholipids between precipitate, "brown phase" and supernatant is shown in the diagrams in FIGS. 8–10.

The results indicate that the variables studied are very important above all to the distribution of sphingomyelin between the three phases.

EXAMPLE 3

A comparison between different solvents for precipitating sphingomyelin was carried out.

Other solvents than acetone may be used for precipitating sphingomyelin. Comparative tests have been carried out with ethyl acetate and 2-pentanone. As starting material, use was made of a heptane extract having the following phospholipid composition: PE 22 mg/ml, PC 28 mg/ml and SM 16 mg/ml. 30 ml of each precipitation solvent were added to 20 ml of heptane extract (volume ratio 1.5:1). All samples were precipitated during 3 h, but at different temperatures: acetone at 20° C., ethyl acetate at 8° C. and 2-pentanone at 5° C. The precipitates were separated by centrifugation.

Distribution of phospholipids between different phases:

|  | % SM | | | % PE/PC | | |
|---|---|---|---|---|---|---|
|  | precipitate | "brown phase" | solution | precipitate | "brown phase" | solution |
| Acetone | 89 | 9 | 1 | 25/23 | 53/48 | 22/28 |
| Ethyl acetate | 54 |  | 46 | 0/3 |  | 100/97 |
| 2-pentanone | 62 |  | 38 | 0/7 |  | 100/93 |

The results indicate that ethyl acetate and 2-pentanone were significantly less effective than acetone for precipitating sphingomyelin. The "brown phase" was only obtained with acetone. The acetone precipitate contained more phosphatidylethanolamine and phosphatidylcholine than the other precipitates. In a washing step, as described in Example 1, these can effectively be washed away.

EXAMPLE 4

1000 l of separated and pasteurised whey having a fat content of 0.050% were filtered through a 0.1 μm ceramic microfilter (Ceraver) in cross-flow according to the process for defatting whey, according to the Alfa Laval technique "BACTO CATCH". 40 l of retention were obtained. The fat content of the whey after microfiltration was <0.01%. The retention was composed as follows:

The fat content of the whey after microfiltration was <0.01%. The retention was composed as follows:

| Protein | 9.0% |  |
|---|---|---|
| Fat | 2.1% | of which 0.7% was phospholipid |
| Ashes | about 1.0% |  |
| Lactose | about 5.0% |  |
| Dry matter | about 17.1% |  |

The retention was evaporated in a vaccuum evaporator to a final volume of 13.7 l, corresponding to a dry matter content of about 50%.

7.0 l of n-heptane and 7.0 l of 95% ethyl alcohol were added, whereupon the mixture was agitated. To the separated heptane phase, 10.0 l of acetone were added. After agitation, the mixture was allowed to stand for 3 h at room temperature. Under these conditions, a selective precipitate of sphingomyelin was obtained.

The precipitate was separated by centrifugation and washed with 500 ml of acetone/heptane in the ratio of 1.4:1 at 25° C. After adjusting the temperature to 20° C., the precipitate was separated once more. The dried precipitate weighed 71 g and contained 70% of sphingomyelin and less than 1% of other phospholipids.

EXAMPLE 5 (Comparative Example)

For comparison, a separation of phospholipids was carried out while using pure column technique.

Column: Buchi 100×460 mm (3750 ml). Packing: Bondesil 40 μm.

The lipids were eluted with three different solutions. 500 g of fat concentrate were mixed with 1 l of n-heptane and 1 l of 75% ethanol. After phase separation, 1.2 l of heptane phase was obtained and applied to the column.

Phospholipid composition of the heptane phase:

| Phosphatidylethanolamine PE: | 12 mg/ml | In all 14 g |
|---|---|---|
| Phosphatidylcholine PC: | 12 mg/ml | 14 g |
| Sphingomyelin SM: | 7 mg/ml | 8 g |

Elution:

| | Solvent n-heptane:2-propanol:water | | | Total consumption |
|---|---|---|---|---|
| Solution 1 | 65 | 35 | 0 | 12.5 l |
| Solution 2 | 61 | 36 | 3 | 23 l |
| Solution 3 | 31 | 58 | 11 | 22 l |

The lipids were eluted and collected in fractions. The neutral lipid fraction (11 l) was eluted with solution 1, the phosphatidylethanolamine fraction (12 l) with solution 2, the phosphatidylcholine/sphingomyelin fraction (15 l) with solution 3. The total consumption amounted to 29 l of n-heptane, 26 l of isopropanol and 3 l of water. The fractions were evaporated in a rotary evaporator.

| Yield: | Fraction 1 | 130 g | neutral lipids |
|---|---|---|---|
|  | Fraction 2 | 12 g | phosphatidylethanolamine |
|  | Fraction 3A | 13 g | phosphatidylcholine and |
|  |  | 5 g | sphingomyelin |
|  | Fraction 3B | 0.4 g | phosphatidylcholine and |
|  |  | 2.9 g | sphingomyelin. |

With 40 μm column packing, no separation between phosphatidylcholine and sphingomyelin was obtained. To obtain pure sphingomyelin, a further chromatography step was required: Buchi 15×460 mm. Column packing: Apex Prepsil Si 20 μm (Sorbent). Fraction 3 was dissolved in 0.6 l of heptane:isopropanol (2:1) during heating to 40° C. The solution was pumped on the column and the phospholipids were then eluted with solution 3 above. 3 l of solution 3 were needed for the elution.

EXAMPLE 6

A comparison between the separating method according to the present invention (A) and merely chromatography (B).

As starting material, use was made of a fat extract in heptane phase (prepared according to Example 1). The comparison was made for 10 l of heptane phase containing 150 g of phosphatidylethanolamine (PE), 150 g of phosphatidylcholine (PC) and 100 g of sphingomyelin (SM).

| | Solvent consumption (litres): | | | |
|---|---|---|---|---|
| | Method A | | Method B | |
| Solvent | Step 1 | Step 2 | Step 1 | Step 2 |
| Acetone | 15 | | | |
| Heptane | | 13 | 320 | 11 |
| Isopropanol | | 14 | 290 | 21 |
| Water | | 3 | 34 | 4 |

Method A corresponds to Example 1 and method B to Example 5.

As illustrated in the Table, there is a great difference in the consumption of solvents between the two separating methods. The great advantage of the separating method according to the invention is the small consumption of solvent. A further advantage of the separating method according to the invention is that simpler process equipment may be used, which means that the investment costs will be lower.

It is difficult to separate PC and SM chromatographically. As appears from the chromatogram in FIG. 3, they elute very close together. In method B above, two column steps have been used. The first separation, step 1, was carried out on 40 μm silica, thereby obtaining a fraction with PC and SM in mixture. This fraction was then applied to a column with 20 μm silica, step 2, for separating the two phospholipids.

In method A, step 1 comprises precipitation of sphingomyelin with acetone. Step 2 comprises column separation with 40 μm silica. Since the compounds which are to be separated in this column step elute far from each other (chromatogram, FIG. 6), a coarser and, consequently, less expensive silica may be used. If just one step is used, a considerably purer sphingomyelin product is obtained with method A (precipitation according to the invention) as compared to method B (chromatography).

We claim:

1. A method for extracting sphingomyelin from a phospholipid-containing fat concentrate, which comprises:

(a) dissolving the fat concentrate in a solvent mixture having essentially polar organic solvent and an essentially non-polar organic solvent, (b) withdrawing a phase consisting mainly of the essentially non-polar organic solvent and phospholipids dissolved therein, whereby the concentration of sphingomyelin in the essentially non-polar organic solvent is in the range of about 2–20 mg/ml, (c) adding to the phase withdrawn in step (b) an organic solvent of intermediate polarity in a volume ratio to the essentially non-polar organic solvent in the range of 1:1–2:1 and at a temperature of about 13° to 25° C., thereby forming a precipitate, comprising mainly sphingomyelin, together with a viscous phase and a solvent phase, and then (d) withdrawing said precipitate and said viscous phase, and separating them from one another.

2. The method of claim 1, which comprises washing said precipitate of mainly sphingomyelin with a solvent mixture of an organic solvent of intermediate polarity and an essentially non-polar organic solvent, thereby dissolving residues of other phospholipids thence sphingomyelin and, subsequently, separating them.

3. The method of claim 2, wherein said precipitate of mainly sphingomyelin is further purified by chromatography.

4. The method of claim 1, wherein a solvent of intermediate polarity is selected from the group consisting of acetone, 2-butanone, 2-pentanone, 3-pentanone, methyl acetate and ethyl acetate.

5. The method of claim 4, wherein said solvent is acetone.

6. The method of claim 1, wherein the essentially polar organic solvent is a lower alkyl alcohol.

7. The method of claim 6, wherein said lower alkyl alcohol is selected from the group consisting of methanol, ethanol, propanol and butanol.

8. The method of claim 1, wherein the essentially non-polar organic solvent is selected from the group consisting of n-heptane, n-hexane, cyclohexane, isooctane, toluene and chloroform.

9. The method of claim 1 wherein the solvent phase which is withdrawn in step d) is lowered to a temperature of about 0°–5° C. in order to precipitate the remaining phospholipids.

10. The method of claim 1, wherein the fat concentrate is derived from milk products, blood products or egg products.

11. The method of claim 10, wherein the fat concentrate is buttermilk or whey.

* * * * *

UNITED STATES PATENT AND TRADEMARK OFFICE
CERTIFICATE OF CORRECTION

PATENT NO. : 5,677,472
DATED : October 14, 1997
INVENTOR(S) : Lena NYBERG et al.

It is certified that error appears in the above-identified patent and that said Letters Patent is hereby corrected as shown below:

On the title page, Item [30], the Foreign Application Date should read:

-- Feb. 11, 1993 --

Signed and Sealed this

Twenty-third Day of December, 1997

Attest:

Attesting Officer

BRUCE LEHMAN

Commissioner of Patents and Trademarks